US011611546B2

(12) United States Patent
Ideguchi et al.

(10) Patent No.: US 11,611,546 B2
(45) Date of Patent: Mar. 21, 2023

(54) METHOD FOR CONTROLLING CONNECTION WITH CLIENT OR SERVER

(71) Applicant: Hitachi, Ltd., Tokyo (JP)

(72) Inventors: Kota Ideguchi, Tokyo (JP); Eriko Ando, Tokyo (JP)

(73) Assignee: HITACHI, LTD., Tokyo (JP)

( * ) Notice: Subject to any disclaimer, the term of this patent is extended or adjusted under 35 U.S.C. 154(b) by 387 days.

(21) Appl. No.: 16/794,284

(22) Filed: Feb. 19, 2020

(65) Prior Publication Data

US 2021/0067506 A1 Mar. 4, 2021

(30) Foreign Application Priority Data

Sep. 4, 2019 (JP) .............................. JP2019-161148

(51) Int. Cl.
*H04L 9/40* (2022.01)
*G06F 12/0862* (2016.01)
*H04L 67/5682* (2022.01)

(52) U.S. Cl.
CPC ...... *H04L 63/0823* (2013.01); *G06F 12/0862* (2013.01); *H04L 63/166* (2013.01); *H04L 67/5682* (2022.05); *G06F 2212/602* (2013.01)

(58) Field of Classification Search
CPC .............. H04L 63/0823; H04L 63/166; H04L 67/2852; H04L 63/04; H04L 67/12; H04L 67/2842; G06F 12/0862; G06F 2212/602
See application file for complete search history.

(56) References Cited

U.S. PATENT DOCUMENTS

| 2013/0057895 | A1 | 3/2013 | Okazawa |
| 2015/0058488 | A1* | 2/2015 | Backholm ............... H04L 61/58 709/226 |
| 2017/0187706 | A1 | 6/2017 | Yamaguchi et al. |
| 2019/0260719 | A1* | 8/2019 | Moore .................. H04L 63/045 |

FOREIGN PATENT DOCUMENTS

| JP | 2013-58042 A | 3/2013 |
| JP | 6289606 B2 | 3/2018 |
| JP | 2018-174507 A | 11/2018 |
| WO | 2015/001671 A1 | 1/2015 |

OTHER PUBLICATIONS

Japanese Office Action received in corresponding Japanese Application No. 2019-161148 dated Dec. 27, 2022.
Santesson, S. et al., "RFC7924 Transport Layer Security (TLS) Cached Information Extension", Jul. 2016, pp. 1-19, URL: https://www.rfc-editor.org/rfc/pdfrfc/rfc7924.txt.pdf.

* cited by examiner

*Primary Examiner* — El Hadji M Sall
(74) *Attorney, Agent, or Firm* — Mattingly & Malur, PC

(57) ABSTRACT

When a client certificate is required to connect to a client according to a predetermined communication protocol, a server receives a connection request that is a message associated with specific information from the client in a handshake for connection with the client. The server makes a client judgement as to whether or not a cache hit occurs, which is to find a summary client certificate in a cache area using the specific information associated with the connection request. When the result of the client judgement is true, the server returns to the client a connection response including hit information indicating that a cache hit occurs.

10 Claims, 11 Drawing Sheets

FIG. 6

CLIENT CERTIFICATE CACHE DB
211
(MAXIMUM NUMBER OF RECORDS = 5)

| CLIENT INFORMATION SET (601) | NODE ID (602) | NEXT PREDICTED CONNECTION TIME (ET) (603) | CONNECTION OVER TIME (OT) (604) |
|---|---|---|---|
| 1 | Node A | ET=110 | OT=200 |
| 2 | Node B | ET=120 | OT=170 |
| 3 | Node C | ET=140 | OT=190 |
| 4 | Node D | ET=150 | OT=180 |
| 5 | Node E | ET=180 | OT=200 |

FIG. 7

CONNECTION REQUEST PERIOD DB
212

| NODE ID (701) | CONNECTION REQUEST PERIOD (DT) (702) | CONNECTION REQUEST INTERVAL HISTORY (703) |
|---|---|---|
| Node A | DT=30 | (30, 30, 30) |
| Node B | DT=70 | (70, 80, 60) |
| Node C | DT=60 | (60, 60, 60) |
| Node D | DT=70 | (80, 80, 50) |
| Node E | DT=100 | (100, 100, 100) |
| Node F | DT=25 | (25, 25, 25) |
| ... | ... | ... |

METHOD FOR CONTROLLING CONNECTION WITH CLIENT OR SERVER

CROSS-REFERENCE TO PRIOR APPLICATION

This application relates to and claims the benefit of priority from Japanese Patent Application number 2019-161148, filed on Sep. 4, 2019 the entire disclosure of which is incorporated herein by reference.

BACKGROUND

The present invention generally relates to a connection between a client and a server.

With the progress of Internet of Things (IoT) technology that connects all things to the Internet, ensuring the security of IoT devices is one of the important social issues. The IoT has, for example, the following characteristics, which require a specific security technique accordingly:
(1) Low specification. The IoT devices have generally low processor speed, memory capacity, battery capacity, and so on. Accordingly, a required security is to be realized with less resources.
(2) Large number of IoT devices. It is said that the number of IoT devices will reach tens of billions in 2020, and the amount of communication data flowing through the network will increase accordingly. In order to efficiently use the communication infrastructure, a required security is to be realized with less amount of traffic data.
(3) No operator. IT devices such as personal computers and smartphones, which are typically operated by an operator, can be authenticated with information such as an ID and a password input by the operator. By contrast, an IoT device such as a sensor device attached to a device to be monitored is often operated with no operator intervention. For this reason, it is considered that it is often desired to guarantee the validity of the IoT device by device authentication. Therefore, there are many opportunities for mutual authentication using a communication protocol.

One method of device authentication is to use a client certificate of an IoT device. As a certificate management technique, for example, there is known a technique disclosed in PLT 1.

[PLT 1] Japanese Patent No. 6289606

SUMMARY

Transport layer security (TLS) or datagram transport layer security (DTLS) is known as one example of communication protocol for making a connection between a client and a server (establishing a state in which data can be transmitted and received) in response to a connection request from the client such as an IoT device. In TLS or DTLS, a handshake is performed in a session between the client and the server in order to establish the connection between the client and the server. In the case of using a client certificate for device authentication, the client certificate is transmitted from the client to the server in the handshake.

In particular, in a case where the client is an IoT device, it is desirable that the amount of calculation resources (amount of calculation resources required for session establishment (e.g., computation amount such as the CPU usage rate)) and the amount of traffic data (total amount of data transmitted and received between the client and the server for session establishment) are reduced, taking the characteristics of "(1) Low specification" and "(2) Large number of IoT devices" described above into consideration. As a method for reducing the amount of traffic data, it is conceivable to reduce the frequency of transmitting a client certificate. This is because the size of the client certificate is large enough to occupy a large proportion of a message to be transmitted.

The disadvantage as the above may also apply to communication protocols other than TLS or DTLS.

When a client certificate is required to connect to a client according to a predetermined communication protocol, a server receives a connection request that is a message associated with specific information from the client in a handshake for connection with the client. The specific information includes, for example, a summary client certificate (summary of client certificate) or at least one of a client ID of the client and a session ID of the connection. The server makes a client judgement as to whether or not a cache hit occurs, which is to find a summary client certificate in a cache area using the specific information associated with the connection request. When the result of the client judgement is true, the server returns to the client a connection response including hit information indicating that a cache hit occurs. When the server receives a completion message indicating the completion of the handshake from the client that has received the response, the server returns a completion response indicating the completion of the handshake to the client to establish a connection.

According to the present invention, it is possible to make a secure communication with less amount of calculation resources and less amount of traffic data.

BRIEF DESCRIPTION OF THE DRAWINGS

FIG. 6 is a diagram illustrating a configuration of a client certificate cache DB;
FIG. 7 is a diagram illustrating a configuration of a connection request period DB.

DESCRIPTION OF EMBODIMENTS

Figure 1:
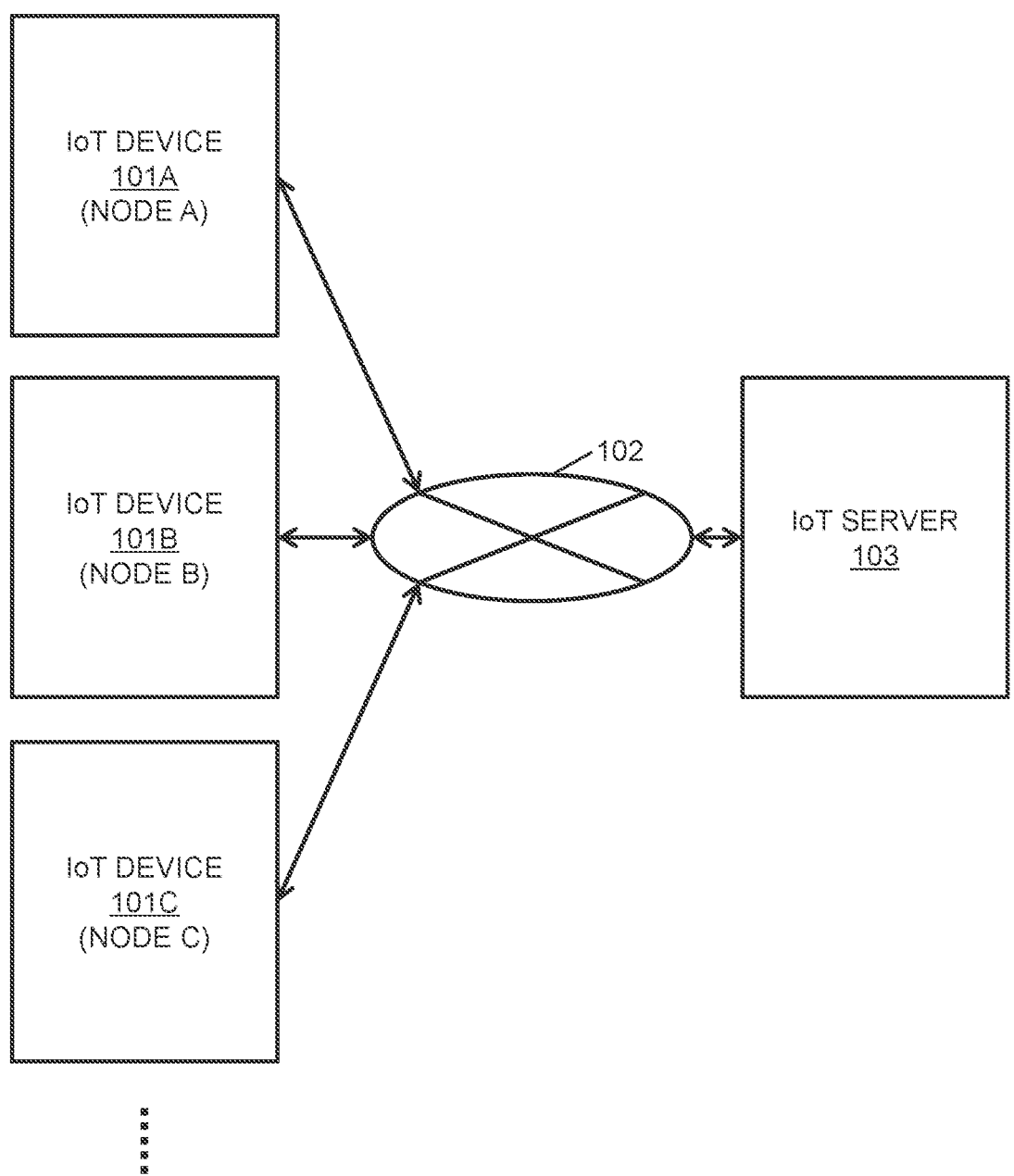
FIG. 1 is a diagram illustrating a configuration of a client-server system according to an embodiment of the present invention.

In the following description, an "interface unit" may include one or more interfaces. The one or more interfaces may be one or more communication interface devices of the same type (e.g. one or more network interface cards (NIC))

or communication interface devices of two or more different types (e.g. NIC and host bus adapter (HBA)).

In the following description, a "memory unit" includes one or more memories, and may typically be a main storage device. At least one memory in the memory unit may be a volatile memory or a nonvolatile memory.

Moreover, in the following description, a "PDEV unit" includes one or more PDEVs, and may typically be an auxiliary storage device. A "PDEV" stands for a Physical storage DEVice, and typically refers to a nonvolatile storage device, for example, a hard disk drive (HDD) or a solid state drive (SSD).

Note that, in the following description, a "storage unit" is at least one (typically, at least the memory unit) of the memory unit and at least a part of the PDEV unit.

Further, in the following description, an "operation unit" is one or more operation modules. At least one operation module is typically a microprocessor such as a central processing unit (CPU), but may be another type of operation module such as a graphics processing unit (GPU). A processor as the at least one operation module may have a single core or multiple cores. At least one operation module may be an operation module in a broad sense such as a hardware circuit (e.g. field-programmable gate array (FPGA) or application specific integrated circuit (ASIC)) that performs a part or all of the processing.

In the following description, some pieces of information that allow for output in response to input are expressed as "xxx table." This information may be data of any structure, and may be a learning model such as a neural network that generates output in response to input. Therefore, "xxx table" can be rephrased as "xxx information." In the following description, configurations of tables are merely examples, and one table may be divided into two or more tables, and all or a part of two or more tables may form one table.

In the following description, some functions are expressed as "yyy unit" (excluding the interface unit, the storage unit, and the operation unit). A function may be implemented by execution of one or more computer programs by the operation unit, or may be implemented by one or more hardware circuits (e.g. FPGA or ASIC). In the case where a function is implemented by execution of a program by the operation unit, since predetermined processing is performed using the storage unit, the interface unit, and/or other components as appropriate, the function may be regarded as at least a part of the operation unit. Processing described with a function as a subject may be regarded as processing performed by the operation unit or a device including the operation unit. A program may be installed from a program source. A program source may be, for example, a program-distributing computer or a computer-readable recording medium (e.g. a non-transitory recording medium). Explanations of functions are merely examples, and a plurality of functions may be combined into one, or one function may be divided into multiple functions.

In the following description, an "information set" refers to a set of logical electronic data for a program such as an application program and may be any of a record, a file, a key/value pair, and a tuple, for example.

Moreover, in the following description, the unit of "time" may be year, month, day, hour, minute, and second, or may be rougher or finer, or may be a unit different therefrom.

In some cases in the following description, in the case where the same type of components are described without being distinguished, a common part of symbols is used. In the case where the same type of components are distinguished, symbols are used. For example, when IoT devices are not distinguished from one another, they are referred to as "IoT devices 101," whereas when the IoT devices are distinguished, they are referred to as an "IoT device 101A" or an "IoT device 101B."

Various embodiments of the present invention will be described below with reference to drawings. Note that, in the following embodiments, TLS or DTLS is adopted as a communication protocol; however, the present invention is also applicable to other communication protocols. Incidentally, although communication between clients and a server in the IoT is adopted as an example in the following embodiments; however, the present invention is also applicable to communication between other clients and servers. Moreover, In the following embodiments, the hash value of a certificate is adopted as the summary of the certificate; however, a summary other than a hash value may be adopted.

First Embodiment

FIG. 1 is a diagram illustrating a configuration of a client-server system according to a first embodiment of the present invention.

Each of a plurality of IoT devices 101 (for example IoT devices 101A to 101C) exists as exemplary clients, and an IoT server 103 exists as an exemplary server. Communication is performed between each of the plurality of IoT devices 101 and the IoT server 103 via a communication network 102 such as a wireless communication network.

Various devices may be adopted as the IoT devices 101. For example, each of the IoT devices 101 may be a sensor device (or another type of device) installed in a factory, and the IoT server 103 may be a server that collects data from each of the IoT devices 101 in the factory.

Note that notations such as "node A" and "node B" in FIG. 1 are node IDs (an example of client IDs) allocated to the IoT devices 101.

Figure 2:
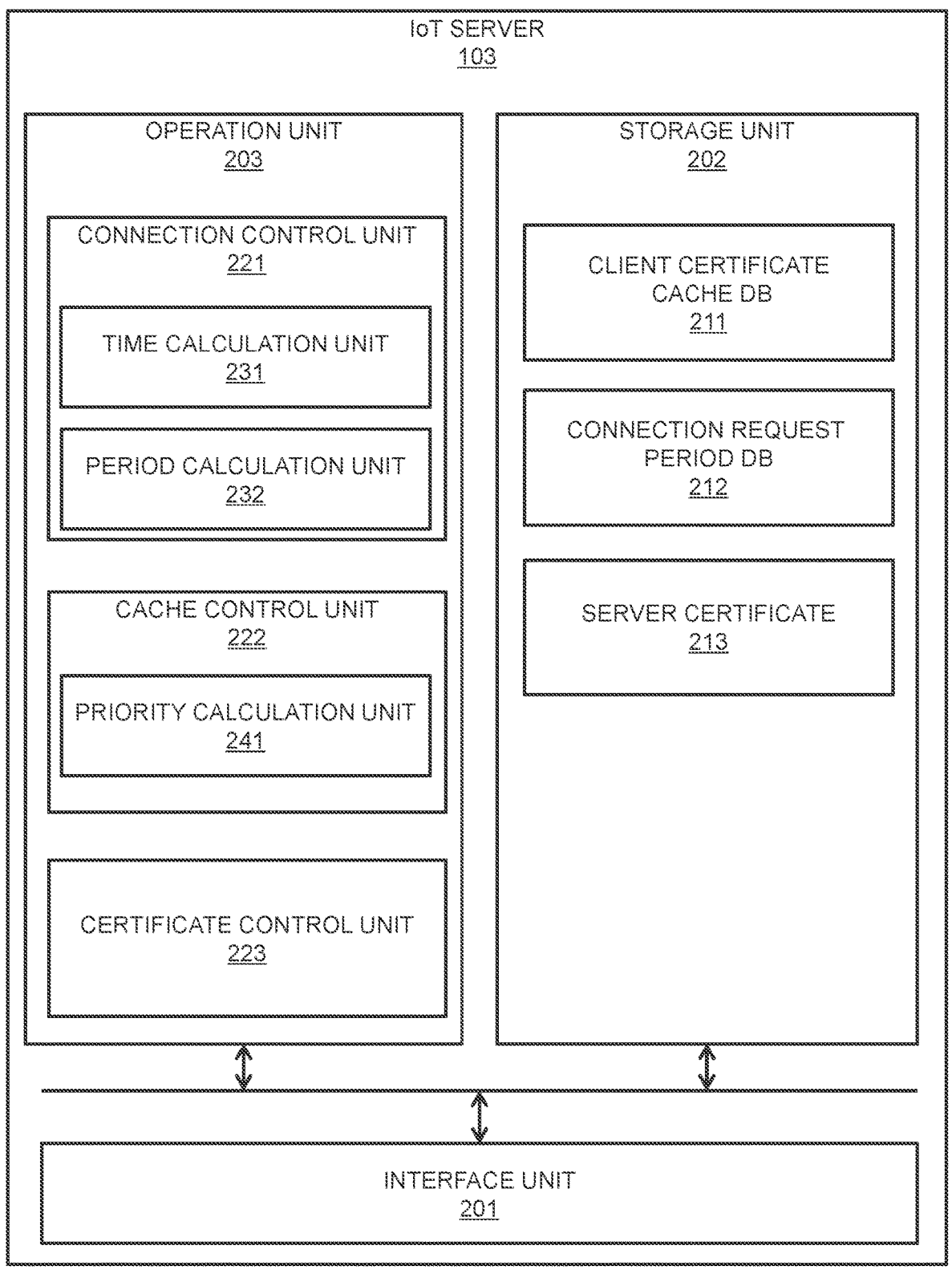
FIG. 2 is a diagram illustrating a configuration of an IoT server.

FIG. 2 is a diagram illustrating a configuration of an IoT server 103.

The IoT server 103 is typically a computer system (one or more computers), and includes an interface unit 201, a storage unit 202, and an operation unit 203 connected thereto.

Communication with each of the IoT devices 101 is performed via the interface unit 201.

The storage unit 202 stores one or more computer programs executed by the operation unit 203 and information to be referred to or updated by the operation unit 203. Examples of such information include a client certificate cache DB (database) 211, a connection request period DB 212, and a server certificate 213. All or a part of a storage area storing the client certificate cache DB 211 is an exemplary cache area of the IoT server 103. The server certificate 213 is an electronic certificate of the IoT server 103.

Functions such as a connection control unit 221, a cache control unit 222, and a certificate control unit 223 are implemented by the operation unit 203 executing one or more computer programs.

The connection control unit 221 controls connection with the IoT devices 101. The connection control unit 221 includes a time calculation unit 231 and a period calculation unit 232. Details of these functions will be described later.

The cache control unit 222 controls the cache of client information sets. The "client information set" refers to an information set including a client certificate. The cache control unit 222 includes a priority calculation unit 241. Details of these functions will also be described later.

The certificate control unit 223 controls processing related to a certificate. Details of this function will also be described later.

Figure 3:
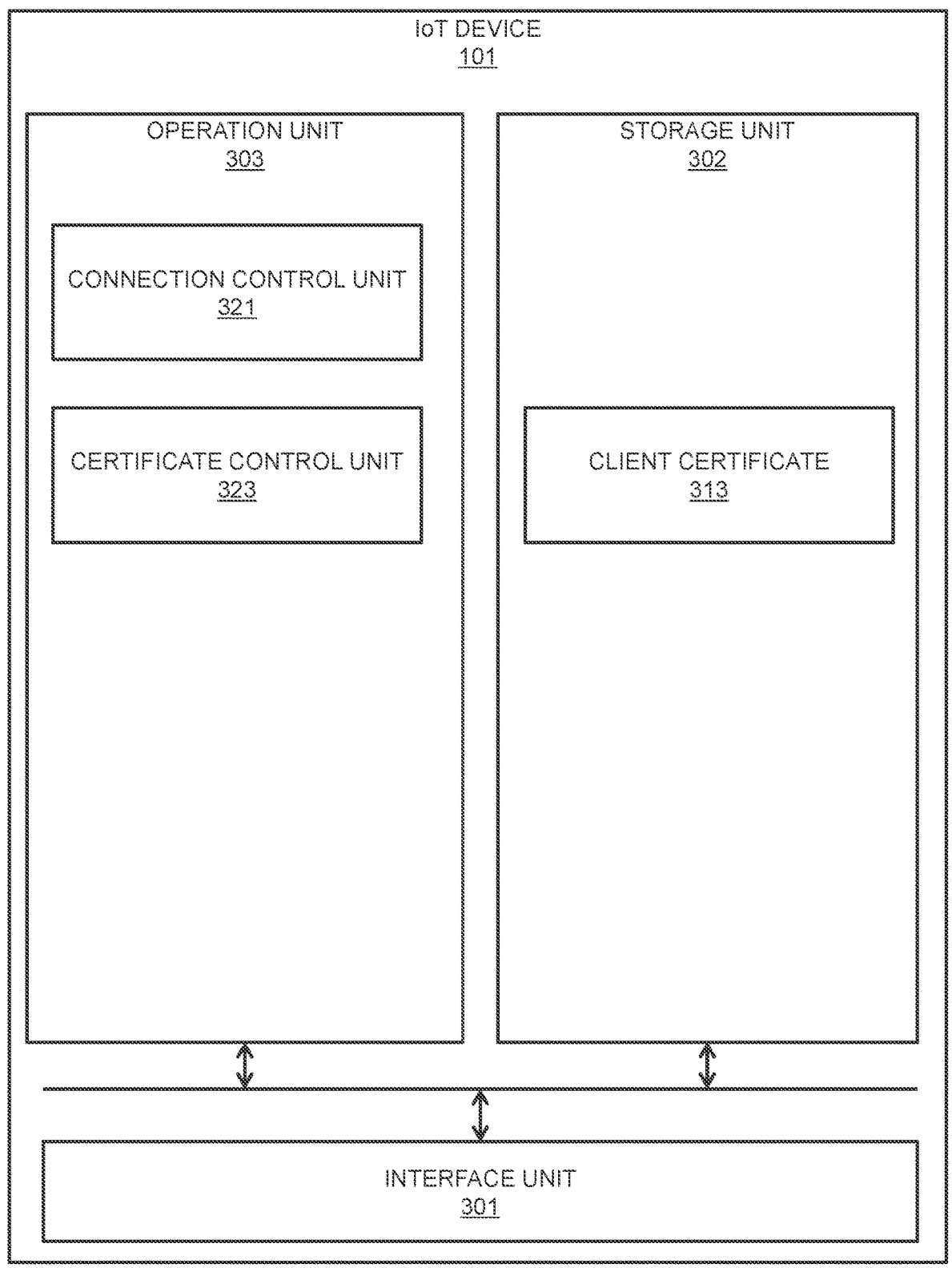
FIG. 3 is a diagram illustrating a configuration of an IoT device.

FIG. 3 is a diagram illustrating a configuration of the IoT device 101.

The IoT device 101 includes an interface unit 301, a storage unit 302, and an operation unit 303 connected to the interface unit 301 and the storage unit 302.

Communication with the IoT server 103 is performed via the interface unit 301.

The storage unit 302 stores one or more computer programs executed by the operation unit 303 and information to be referred to or updated by the operation unit 303. An example of such information is a client certificate 313. The client certificate 313 is an electronic certificate of the IoT device 101.

Functions such as a connection control unit 321 and a certificate control unit 323 are implemented by the operation unit 303 executing one or more computer programs. The connection control unit 321 controls connection with the IoT server 103. The certificate control unit 323 controls processing related to a certificate. Details of these functions will be described later.

Hereinafter, for simplicity of description, it is assumed that, between one IoT device 101 and the IoT server 103, one session is performed.

According to TLS or DTLS, a handshake is performed in a session between the IoT device 101 and the IoT server 103. In addition, according to TLS or DTLS, server authentication (authentication using the server certificate 213) is essential, and client authentication (authentication using the client certificate 313) is optional. As described above, since the IoT device 101 is often operated with no operator intervention, it is desirable to make client authentication essential.

Figure 4:
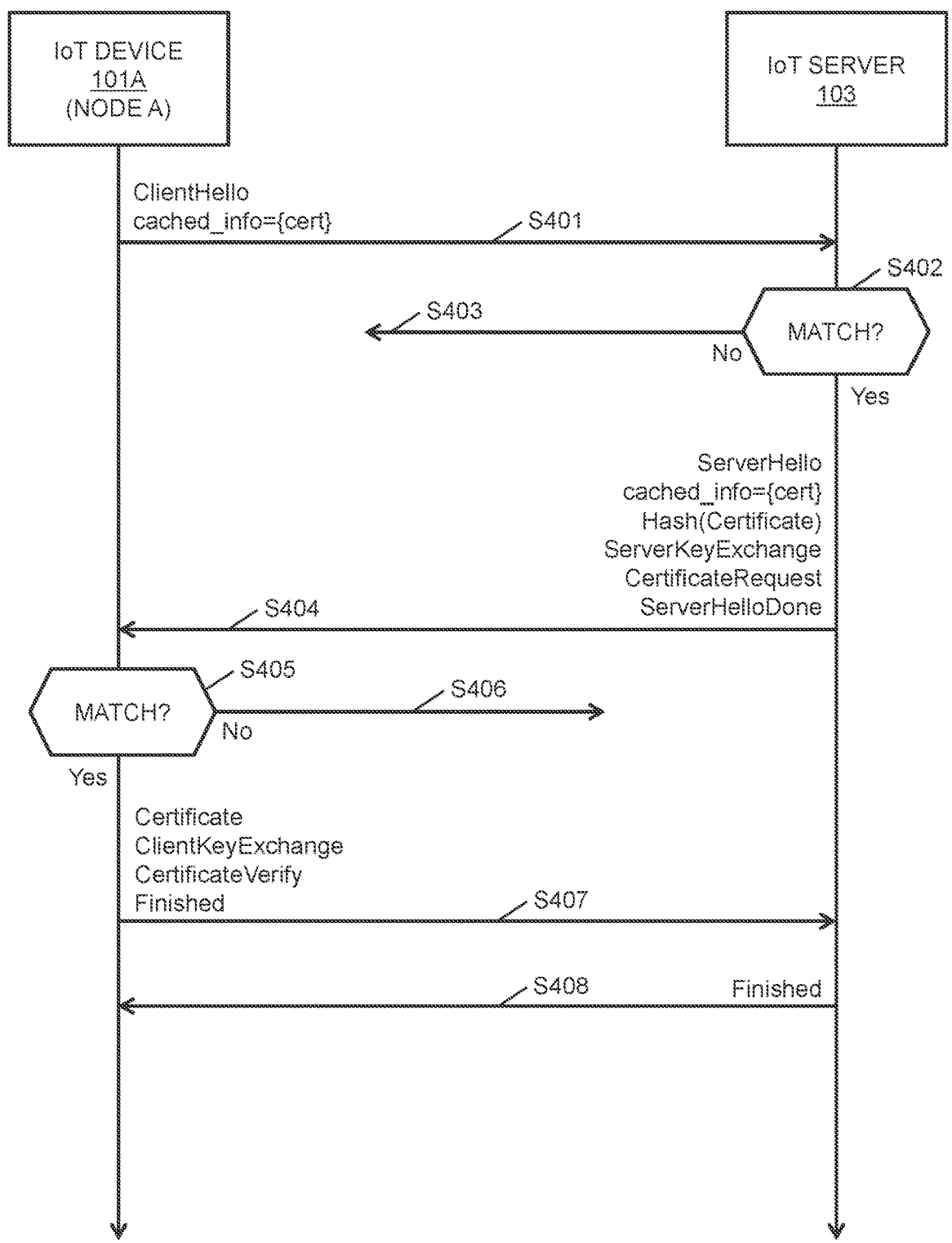
FIG. 4 is a diagram illustrating an overview of a general flow of a handshake that requires client authentication.

FIG. 4 is a diagram illustrating an overview of a general flow of a handshake in which client authentication is essential.

The connection control unit 321 of the IoT device 101 transmits a "ClientHello" message to the IoT server 103 (S401). Although not illustrated, the ClientHello is associated with a random session ID (e.g., a dummy session ID). For example, the ClientHello includes a session ID. The ClientHello also has an extension field called cached_info. In cached_info, cert is set by the connection control unit 321. Here, cert includes a server certificate flag. The server certificate flag is information indicating whether to use a server certificate cached in the IoT server 103. If the server certificate flag is "1" (an example of a value indicating that the server certificate cached in the IoT server 103 is used), cert further includes a hash server certificate (a hash value of the server certificate). The hash server certificate itself may be cached in the IoT device 101, or the server certificate may be cached in the IoT device 101 and the hash server certificate may also be generated from the server certificate by the certificate control unit 323.

The connection control unit 221 of the IoT server 103 receives the ClientHello. The certificate control unit 223 makes a validity determination (S402). The validity determination includes a server determination. The server determination is a determination as to whether or not a hash server certificate is associated with the ClientHello and the hash server certificate matches the hash value of the server certificate 213 in the storage unit 202.

If the determination result in S402 is false (S402: No), the connection control unit 221 transmits the server certificate 213 (or its hash value) in the storage unit 202 to the IoT device 101 (S403). As a result, the hash server certificate (or the server certificate 213) is cached in the cache area of the IoT device 101 (part of the storage unit 302). Thereafter, predetermined processing is performed between the IoT device 101 and the IoT server 103.

If the determination result in S402 is true (S402: Yes), the connection control unit 221 performs response processing to the IoT device 101 (S404). S404 includes the following steps:

A ServerHello is transmitted to the IoT device 101 by the connection control unit 221. Although not illustrated, the ServerHello message is associated with an official session ID. As a result, the session ID is shared between the IoT server 103 and the IoT device 101.

The ServerHello also has an extension field called cached_info. In cached_info, cert is set by the connection control unit 221. Here, cert includes a server cache flag. The server cache flag is information indicating that the hash server certificate associated with the ClientHello matches the hash value of the server certificate 213 in the storage unit 202.

A Hash(Certificate) is transmitted to the IoT device 101 by the connection control unit 221. The Hash(Certificate) is a message including the hash value of the server certificate 213 in the storage unit 202.

A ServerKeyExchange is transmitted to the IoT device 101 by the connection control unit 221. The ServerKeyExchange is a message including the public key of the IoT server 103.

A CertificateRequest is transmitted to the IoT device 101 by the connection control unit 221. The CertificateRequest is a message indicating a request for a client certificate.

A ServerHelloDone is transmitted to the IoT device 101 by the connection control unit 221. The ServerHelloDone is a message indicating that transmission from the IoT server 103 is completed.

The connection control unit 321 of the IoT device 101 receives the message transmitted from the IoT server 103 in the response processing (S404). The certificate control unit 323 makes a validity determination (S405). The validity determination includes a server determination. The server determination is a determination as to whether or not the hash server certificate in the Hash(Certificate) matches the cached hash server certificate.

If the determination result in S405 is false (S405: No), the connection control unit 321 transmits a message indicating a request for the server certificate 213 to the IoT device 101 (S406). Thereafter, predetermined processing is performed between the IoT device 101 and the IoT server 103.

If the determination result in S405 is true (S405: Yes), the connection control unit 321 performs response processing to the IoT server 103 (S407). S407 includes the following steps:

A Certificate is transmitted to the IoT server 103 by the connection control unit 321. The Certificate is a message including the client certificate 313 in the storage unit 302. As a result, the client certificate 313 (or its hash value) is cached in the cache area of the IoT server 103.

A ClientKeyExchange is transmitted to the IoT server 103 by the connection control unit 321. The ClientKeyExchange is a message including the public key of the IoT device 101.

A CertificateVerify is transmitted to the IoT server 103 by the connection control unit 321. The CertificateVerify is a message including a signature for proving that the IoT device 101 has the correct private key.

A Finished is transmitted to the IoT server 103 by the connection control unit 321. The Finished is a message indicating the completion of the handshake, and includes hash values of all messages received from the IoT server 103 in that handshake.

The connection control unit 221 of the IoT server 103 receives Finished from the IoT device 101, checks that Finished, and returns a Finished to the IoT device 101 (S408). The Finished transmitted to the IoT device 101 includes hash values of all messages received from the IoT device 101 in that handshake.

According to the description with reference to FIG. 4, the client certificate 313 itself is transmitted from the IoT device 101. However, the size of the client certificate 313 is large enough to occupy a large proportion of the message to be transmitted. Therefore, it is desirable to reduce the frequency of transmitting the client certificate 313.

Figure 5:
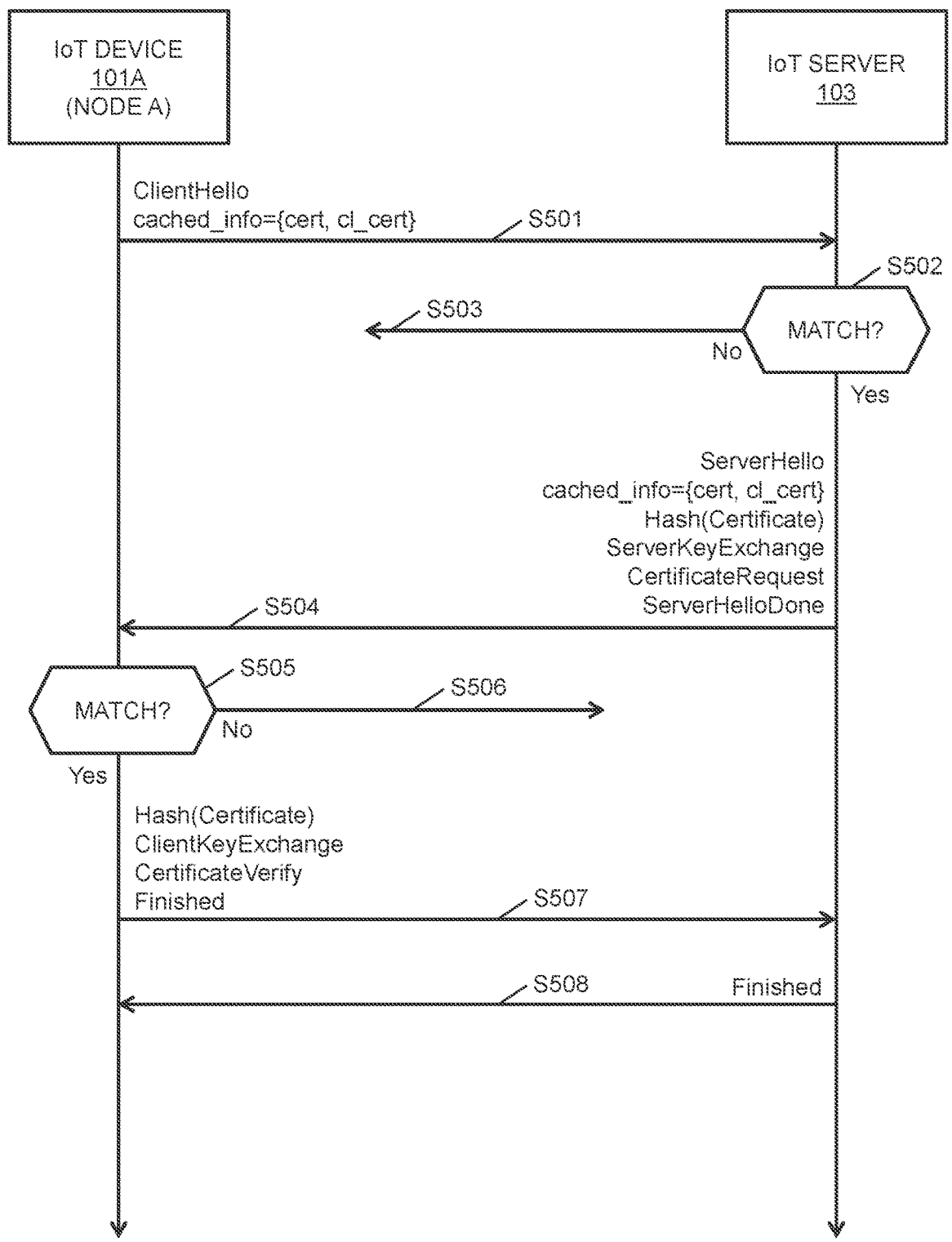
FIG. 5 is a diagram illustrating an overview of a flow of a handshake according to a first embodiment of the present invention.

Therefore, in the present embodiment, a handshake illustrated in FIG. 5 is adopted.

FIG. 5 is a diagram illustrating an overview of a flow of the handshake according to the present embodiment.

The connection control unit 321 of the IoT device 101 transmits a ClientHello to the IoT server 103 (S501), while cl_cert as well as cert is set in cached_info of the ClientHello by the connection control unit 321. Here, cl_cert includes a client certificate flag indicating whether to use the client certificate cached in the IoT server 103. If the client certificate flag is "1" (an example of a value indicating that the client certificate cached in the IoT server 103 is used), cl_cert further includes the hash client certificate itself.

When receiving the ClientHello, the certificate control unit 223 of the IoT server 103 makes a validity determination (S502). The validity determination in S502 includes a client judgement in addition to the server determination. The client judgement is a determination as to whether or not a cache hit occurs, which is to find the same hash client certificate in the cache area using the hash client certificate in cl_cert. "To find the same hash client certificate in the cache area of the IoT server 103" may be to obtain a hash client certificate from the client certificate, which is stored in the cache area, or may be to obtain the hash client certificate, which is stored in the cache area.

The case where the determination result of S502 is false (S502: No) means one or both of the case where the result of the server determination is false and the case where the result of the client judgement is false. If the result of the server determination is false, S403 is performed. If the result of the client judgement is false, the connection control unit 221 transmits a CertificateRequest (a message indicating a request for the client certificate) to the IoT device 101 (S503). As a response to the CertificateRequest, the connection control unit 221 receives the client certificate 313 itself from the IoT device 101, and caches the client certificate 313 or its hash value in the client certificate cache DB 211.

If the determination result in S502 is true (S502: Yes), the connection control unit 221 performs response processing to the IoT device 101 (S504). S504 is different from the response processing in S404 in the following points:

cl_cert as well as cert is set in cached_info of the ServerHello by the connection control unit 221. Here, cl_cert includes a client cache flag. The client cache flag is information indicating that a cache hit occurs for the hash client certificate associated with the ClientHello.

A CertificateRequest is transmitted to the IoT device 101 by the connection control unit 221. The CertificateRequest is a message indicating a request for the hash client certificate.

The connection control unit 321 of the IoT device 101 receives the message transmitted from the IoT server 103 in the response processing (S504). The certificate control unit 323 makes the same validity determination as in S405 (S505).

If the determination result in S505 is false (S505: No), the connection control unit 321 performs the same processing as in S406 (S506).

If the determination result in S505 is true (S505: Yes), the connection control unit 321 performs response processing to the IoT server 103 (S507). S507 is different from the response processing in S407 in the following points:

A Hash(Certificate) is transmitted to the IoT server 103 by the connection control unit 321 instead of the Certificate. The Hash(Certificate) is a message including the hash client certificate that is the hash value of the client certificate 313 in the storage unit 302.

After the response processing in S507, the same processing as in S408 is performed (S508).

As described above, according to FIG. 5, when the client certificate 313 is required to connect to the IoT device 101 according to TLS or DTLS, the connection control unit 221 of the IoT server 103 receives from the IoT device 101 a ClientHello (an example of a connection request) associated with the hash client certificate in a handshake for connection with the IoT device 101. The certificate control unit 223 makes a client judgement as to whether or not a cache hit occurs, which is to find the same hash client certificate in the cache area using the hash client certificate associated with the ClientHello. If the result of the client judgement is true, the connection control unit 221 returns to the IoT device 101 a ServerHello (an example of a connection response) including a client cache flag (an example of hit information) indicating that the cache hit occurs. When the connection control unit 221 receives a Finished (an example of a completion message that indicates the completion of the handshake) from the IoT device 101 that has received the ServerHello, the connection control unit 221 returns a Finished (an example of a completion response that indicates the completion of the handshake) to the IoT device 101 to establish a connection.

Even if client authentication is essential, the client certificate 313 itself is not transmitted or received as long as the client certificate 313 or its hash value is cached in the cache area of the IoT server 103. As a result, it is possible to make a secure communication with less amount of calculation resources and less amount of traffic data.

Note that the hash client certificate may be transmitted between the transmission of the ClientHello and the transmission of the Finished instead of being associated with the ClientHello. However, associating the hash client certificate with the ClientHello is useful, for example, in the following respects:

A ClientHello has an extended field called cached_info, and a hash server certificate is set in cached_info. In the validity determination in S502, both the server determination and the client judgement are performed, and the hash server certificate and the client judgement certificate used in the determinations are set in the same extension field. For this reason, the efficiency of the validity determination (S502) in the IoT server 103 can be expected.

A response to a ClientHello is a ServerHello, but the ServerHello also has an extension field called cached_info. For this reason, cl_cert (client cache flag), which is an example of hit information, as well as cert (server cache flag) can be set in the cached_info. For this reason, the efficiency of the validity determination (S505) in the IoT device 101 can be expected.

As described above, if the result of the client judgement in the IoT server 103 is false, that is, if the client judgement results in no cache hit, the client certificate 313 is requested from the IoT server 103 to the IoT device 101, and then, the client certificate 313 is transmitted from the IoT device 101 to the IoT server 103. Accordingly, improving the cache hit rate in the client judgement contributes to a reduction in the frequency of transmitting the client certificate 313.

Therefore, in this embodiment, cache control described below is performed.

When no cache hit occurs in the validity determination (S502) for a connection request (ClientHello) from an IoT device 101, the connection control unit 221 calculates predicted next connection time which is the sum of time related to reception of the latest connection request from the IoT device 101 and a connection request period of the IoT device 101. At least when the cache area of the IoT server 103 is full, the cache control unit 222 determines whether to cache, in the cache area, a client information set (information set including a client certificate or its hash value) associated with the latest connection request from the IoT device 101 on the basis of the predicted next connection time calculated for the IoT device 101. As a result of this, improvement of the cache hit rate can be expected without requiring each of the IoT devices 101 to notify the IoT server 103 of the predicted next connection time.

Note that the "time related to reception of the connection request" may be the current time when the connection request has been received, the time when the cache area has been accessed in the validity determination (S502), the current time when an access related to session termination has been received, or the time indicated by a timestamp embedded in the connection request.

In addition, "the cache area is full" refers to a state where the total volume of all the cached client information sets has reached the capacity upper limit (e.g. the capacity of the cache area, or a predetermined percentage thereof). The "total volume" may be the number of cached client information sets, and likewise the "capacity upper limit" may be the maximum value of the number of client information sets that can be cached in the cache area.

Hereinafter, the cache control in the present embodiment will be described in detail.

The time calculation unit 231 of the connection control unit 221 calculates predicted next connection time and connection over time. The period calculation unit 232 of the connection control unit 221 calculates (updates) a connection request period. The terms "predicted next connection time," "connection over time," and "connection request period" will be described later.

The cache control unit 222 controls the cache of client information sets. The priority calculation unit 241 of the cache control unit 222 calculates (determines) cache priority of client information sets. The term "cache priority" will be described later.

Hereinafter, for simplicity of description, it is assumed that, between one IoT device 101 and the IoT server 103, one session is performed.

FIG. 6 is a diagram illustrating a configuration of the client certificate cache DB 211.

The client certificate cache DB 211 is a DB of client information sets. The client certificate cache DB 211 has a record for each client certificate. Each record stores information such as client information sets 601, node IDs 602, predicted next connection time 603, and connection over time 604. Hereinafter, one session will be taken as an example (referred to as a "client certificate of interest" in the description of FIG. 6).

The client information set 601 refers to an information set including the client certificate of interest. A node ID 602 indicates a node ID of an IoT device 101 possessing the client certificate of interest. The predicted next connection time 603 indicates predicted time related to reception of the next connection request (request to resume a session) corresponding to the client certificate of interest. The connection over time 604 indicates the maximum time (the farthest future time allowed) allowed for the client certificate corresponding to the client certificate of interest to be cached without reception of a next connection request. The connection over time 604 is the sum of predicted next connection time of the client certificate of interest and allowable delay time for an IoT device 101 having the client certificate of interest (that is, time obtained by adding the allowable delay time to the predicted next connection time). Both the connection over time and the predicted next connection time are calculated by the time calculation unit 231. The "allowable delay time" refers to time that is allowed for reception of a connection request to be delayed from predicted next connection time.

In this manner, each of the client information sets 601 cached in the cache area is associated with predicted next connection time 603 calculated for the client information set 601. This allows predicted next connection time calculated with respect to a cache miss to be compared to predicted next connection time 603 of each of the client information sets 601 cached in the cache area, whereby whether to cache a new session information set related to no cache hit can be determined.

As described above, the cache area is all or a part of the storage area for storing the client certificate cache DB 211. Out of the client information sets 601, the node IDs 602, the predicted next connection time 603, and the connection over time 604, at least the client information sets 601 may be stored in the cache area. In other words, each record included in the client certificate cache DB 211 may be a logical record. For example, a part of a record may be on the memory unit as the main storage device and the rest of the record may be on the PDEV unit as the auxiliary storage device.

As an example of the capacity upper limit of the cache area, the maximum value of the number of client information sets that can be stored in the client certificate cache DB 211 is specified. Specifically, for example, as in the example illustrated in FIG. 6, the maximum number of records included in the client certificate cache DB 211 is five.

Note that a "client information set" may include information referred to at the time of communication (e.g., information indicating an encryption scheme or information referred to in mutual authentication processing) in addition to a client certificate or its hash value. The client information set may further include a client ID or a session ID.

Access to the client certificate cache DB 211 is performed by either the cache control unit 222 or the certificate control unit 223. For example, the certificate control unit 223 searches the cache area for the same hash client certificate as the hash client certificate obtained from the IoT device 101, and reads the hit client information set. Moreover, for example, the cache control unit 222 can add (insert) a record including a client information set 601, a node ID 602, predicted next connection time 603, and connection over time 604 to the client certificate cache DB 211. That is, the cache control unit 222 can cache a new client information set. Furthermore, for example, the cache control unit 222 can evict a record (client information set) from the client certificate cache DB 211 (cache area). Addition or eviction of a client information set may be based on the cache priority. The cache priority is determined by the priority calculation unit 241. The cache control unit 222 can also sort the records by using either the predicted next connection time 603 or the connection over time 604 as a key.

FIG. 7 is a diagram illustrating a configuration of the connection request period DB 212.

The connection request period DB 212 is a DB of connection request periods. The connection request period DB 212 has a record for each of the IoT devices 101. Each record stores information such as a node ID 701, a connection request period 702, and a connection request interval history 703. Hereinafter, one IoT device 101 will be taken as an example (referred to as an "IoT device of interest 101" in the description of FIG. 7).

A node ID 701 indicates a node ID of an IoT device of interest 101. A connection request period 702 indicates a connection request period of the IoT device of interest 101. The connection request periods are calculated by the period calculation unit 232. A connection request interval history 703 indicates the history of connection request intervals (reception intervals of connection requests) (e.g. the latest N connection request intervals (N=3 in FIG. 7)).

Each record included in the connection request period DB 212 may be a logical record. For example, a part of a record may be on the memory unit as the main storage device and the rest of the record may be on the PDEV unit as the auxiliary storage device.

For each of the IoT devices 101, the period calculation unit 232 in the connection control unit 221 refers to a connection request interval history 703 of each of the IoT devices 101 and updates the connection request period of the IoT device 101 on the basis of a plurality of connection request intervals including the latest connection request interval (interval between time related to reception of the latest connection request and time related to reception of the preceding connection request) of the IoT device 101. As a result, as the connection request period, it is expected that an appropriate connection request period cane obtained. Therefore, improvement in the appropriateness of the predicted next connection time referred to at the time of cache control can be expected. The update of the connection request period may be performed at any timing upon processing of a connection request (e.g. when an access related to session termination is received). A "connection request period" is a value (e.g. an average value, the maximum value, or the minimum value) based on a plurality of connection request intervals.

A node ID is an ID obtained in the session, and is also an ID that can uniquely identify an IoT device 101. By using (efficiently utilizing) such a node ID that is naturally obtained, the correspondence relationship between an IoT device 101 and a connection request period (and the connection request interval history) can be accurately maintained. Note that a node ID may be, for example, a client ID, or may be, for example, a hash value of a client certificate obtained from an IoT device 101.

Figure 8:
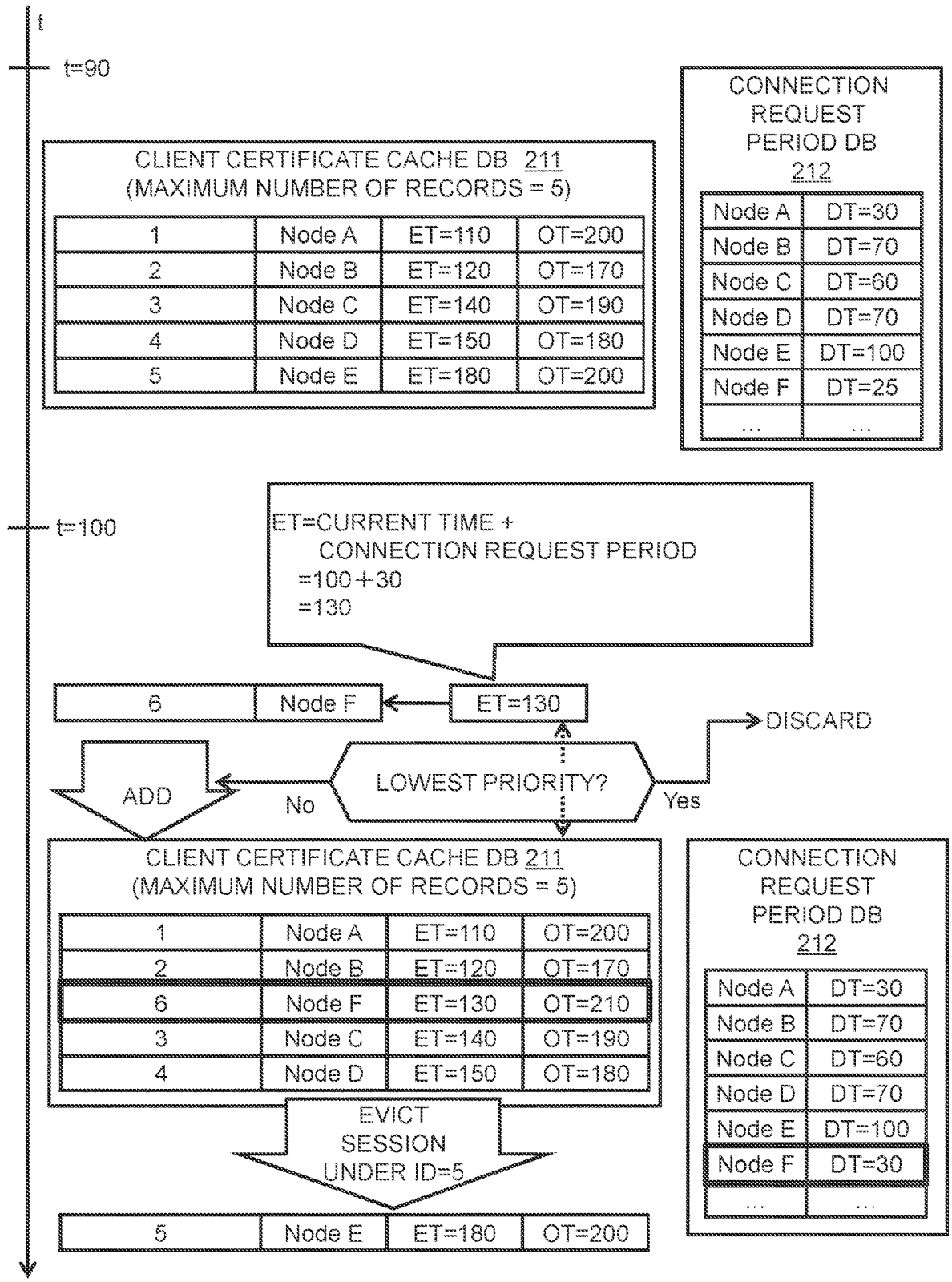
FIG. 8 is a diagram illustrating an overview of cache control performed in the first embodiment of the present invention.

FIG. 8 is a diagram illustrating an overview of cache control performed in the present embodiment. Note that, in the following description, "client n" (n is a natural number) indicates a client with client ID=n. In addition, in the description of FIG. 8, an IoT device 101 will be referred to by using a node ID for the sake of convenience. Specifically, for example, "node A" refers to the IoT device 101A (see FIG. 1).

For example, it is assumed that the cache area is full at time t=90. For example, the client certificate cache DB 211 stores five client information sets (five records), each corresponding to clients 1 to 5. Clients 1 to 5 correspond to nodes A to E, respectively.

Then, at time t=100, let us assume that client 6 has occurred from node F. Since the client information set of client 6 is not cached (because there is no record corresponding to client 6 in the client certificate cache DB 211), no cache hit occurs.

In this case, the time calculation unit 231 calculates predicted next connection time corresponding to client 6 for the node F. Here, for example, the predicted next connection time of client 6 is the sum of the current time and a connection interval period of the node F. The "current time" referred to in this paragraph is an example of time related to reception of the connection request of client 6, and is, for example, cache access time related to client 6 (for example, time of accessing the client certificate cache DB 211 for a client judgement for client 6). In addition, the "connection interval period" referred to in this paragraph is the latest period updated on the basis of recent connection request intervals and the connection request interval history of the node F (in the example of FIG. 8, this period is updated from "25" to "30").

At least when the cache area is full, the priority calculation unit 241 calculates the cache priority of the client information set of client 6 and cache priority of each of the client information sets cached in the cache area (client information set of each of clients 1 to 5). The cache control unit 222 determines whether to cache the client information set of client 6 in the cache area on the basis of the above cache priority. The cache priority of each client information set is based on predicted next connection time associated with the client information set. In the absence of connection over time, synonymy is that the cache priority is high and that predicted next connection time is close to the current time. In other words, calculation of the cache priority and acquisition of predicted next connection time are synonymous. Depending on the level of the cache priority, whether to cache the client information set of client 6 and which client information set to evict from the client certificate cache DB 211 for the client information set of client 6 to be cached can be determined. For example, the cache control unit 222 determines whether the cache priority of the client information set of client 6 is lower than the cache priority of any client information set cached in the cache area (lowest priority determination). If the result of the determination is false, the cache control unit 222 evicts, from the cache area, a client information set having the lowest cache priority among the client information sets cached in the cache area (according to the example of FIG. 8, the client information set of client 5 having the predicted next connection time farthest from the current time t=100). The cache control unit 222 caches (adds) the client information set of client 6.

In contrast, when the result of the lowest priority determination is true, the cache control unit 222 discards the client information set of client 6 (alternatively, terminates generation of the client information set of client 6 without completing it).

Note that the cache priority of each client information set calculated by the priority calculation unit 241 may be based on the connection over time associated with the client information set in addition to the predicted next connection time associated with the client information set. For each client information set, connection over time is calculated by the time calculation unit 231. For example, the connection over time is the sum of the predicted next connection time associated with the client information set of client 6 and allowable delay time associated with the node F corresponding to the client information set. As a result, appropriate cache priority can be expected, whereby a client information set remains in the cache area unused, and as a result, an improvement in the cache hit rate can be expected.

Allowable delay time for at least one IoT device 101 (node) may be different from allowable delay time for any of other IoT devices 101. As a result of this, appropriate connection over time can be expected depending on the type or other features of the IoT devices 101, and thus improvement of the cache hit rate can be expected.

Allowable delay time for each of the IoT devices 101 may be based on at least one of a connection request period corresponding to the IoT device 101 and a connection request interval history of the IoT device 101. As a result of this, connection over time can be expected to be appropriate for the situation of connection request intervals the IoT device 101, and thus improvement of the cache hit rate can be expected.

In addition, the following relationships (R1) to (R3) may be adopted as the relationship of cache priority. According to (R1), a client information set, remaining unused in the cache area even after the connection over time has passed, can be preferentially evicted from the cache area. According to (R2), from among client information sets, remaining unused in the cache area even after the connection over time has passed, a client information set which has not been used for the longest time can be preferentially evicted from the cache area. According to (R3), from among client information sets which may be used in the near future since the connection over time has not been reached, a client information set, which is predicted to be used the latest, can be preferentially evicted from the cache area.

(R1) The cache priority of a client information set, connection over time of which is older than the current time, is lower than the cache priority of a client information set, connection over time of which is the current time or future time.

(R2) Among client information sets, connection over time of which is older than the current time, as the connection over time is farther from the current time, the lower the cache priority is.

(R3) Among client information sets, connection over time of which is the current time or future time, as the predicted next connection time is farther from the current time, the lower the cache priority is.

Exemplary processing performed in the present embodiment will be described below.

Figure 9:
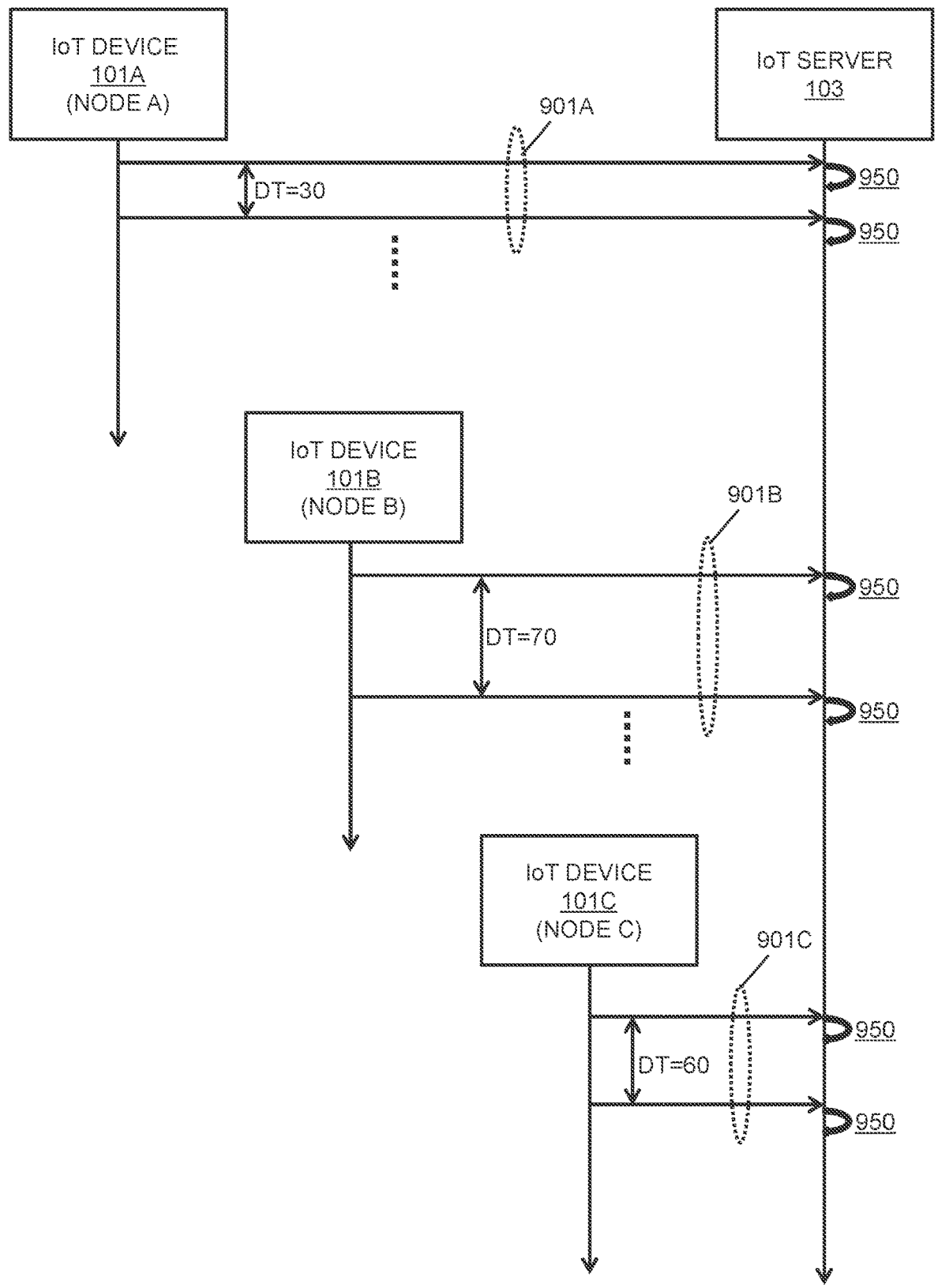
FIG. 9 is a diagram illustrating a flow of processing between IoT devices and the IoT server.

FIG. 9 is a diagram illustrating a flow of processing between the IoT devices 101 and the IoT server 103.

For example, each of the IoT devices 101A to 101C issues a connection request at the connection request periods exemplified in FIG. 7. Specifically, for example, the IoT device 101A transmits a connection request to the IoT server 103 at a connection request period of "30" (901A). The IoT device 101B transmits a connection request to the IoT server 103 at a connection request period of "70" (901B). The IoT device 101C transmits a connection request to the IoT server 103 at a connection request period of "60" (901C).

The IoT server 103 performs a series of processing (950) including connection control and cache control every time a connection request is received.

Figure 10:
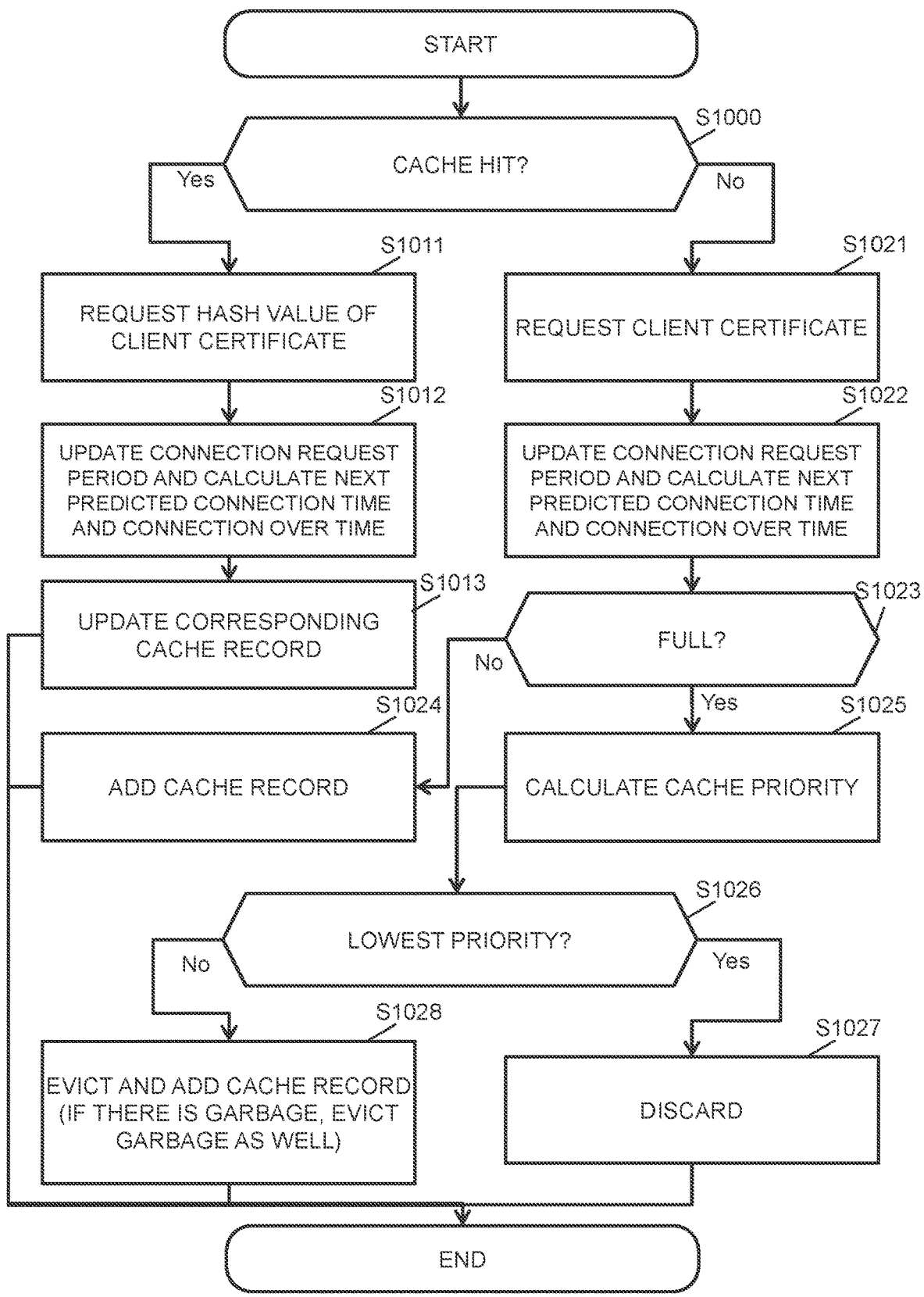
FIG. 10 is a diagram illustrating a flow of cache control in a client judgement in the IoT server.

FIG. 10 is a diagram illustrating a flow of cache control in a client judgement in the IoT server 103. Hereinafter, in the description of FIG. 10, the received connection request is referred to as a "connection request of interest," an IoT device 101 corresponding to the client ID associated with the connection request of interest is referred to as an "IoT device of interest 101", and a client information set of the IoT device of interest 101 is referred to as a "client information set of interest".

The certificate control unit 223 determines whether there is a cache hit, which is a state where a client information set of interest exists in the client certificate cache DB 211 (S1000).

If the determination result of S1000 is true (S1000: Yes), that is, if there is a cache hit, the following processing is performed. That is, the connection control unit 221 transmits a ServerHello with the cl_cert flag set and a CertificateRequest to the IoT device of interest 101 (S1011). In S1012, the period calculation unit 232 updates the connection request period of the IoT device of interest 101 on the basis of the latest connection request interval. Furthermore in S1012, the time calculation unit 231 calculates predicted next connection time of the IoT device of interest 101 from the current time (e.g., the time at S1000) and the connection request period, and calculates connection over time from the predicted next connection time and allowable delay time of the IoT device of interest 101. The cache control unit 222 updates the cache record (record in the client certificate cache DB 211) corresponding to the IoT device of interest 101 (S1013). Specifically, the cache control unit 222 updates the predicted next connection time 603 and the connection over time 604 associated with the cached client information set of interest to the predicted next connection time and the connection over time calculated in S1012.

When the determination result of S1000 is false (S1000: No), that is, if no cache hit occurs, the following processing is performed. That is, the connection control unit 221 transmits a ServerHello with the cl_cert flag not set and a CertificateRequest to the IoT device of interest 101 (S1021). In S1022, the same processing as S1012 is performed. The cache control unit 222 determines whether the cache area is full (S1023). If the determination result in S1023 is false (S1023: No), the cache control unit 222 adds a cache record including the client information set of interest to the client certificate cache DB 211 (caches the client information set of interest) (S1024). In contrast, if the determination result in S1023 is true (S1023: Yes), the cache control unit 222 calculates the cache priority of the client information set of interest and the cache priority of each of the cached client information sets (S1025). The cache control unit 222 determines whether the cache priority of the client information set of interest is the lower than the cache priority of any of the cached client information sets (S1026). If the determination result of S1026 is true (S1026: Yes), the cache control unit 222 discards the client information set of interest (S1027). If the determination result of S1026 is false (S1026: No), the cache control unit 222 evicts the cache record including the client information set having the lowest cache priority from the client certificate cache DB 211, and adds the cache record including the client information set of interest to the client certificate cache DB 211 (S1028).

Incidentally, at any timing during S1000 to S1028 (e.g., S1028), the cache control unit 222 may evict garbage from the client certificate cache DB 211 if there is any. The "garbage" referred to here is a cache record including a client information set, connection over time of which is older than the current time. When the garbage is evicted, a new client information set can be cached, and thus as a result, improvement in the cache hit rate can be expected.

Figure 11:
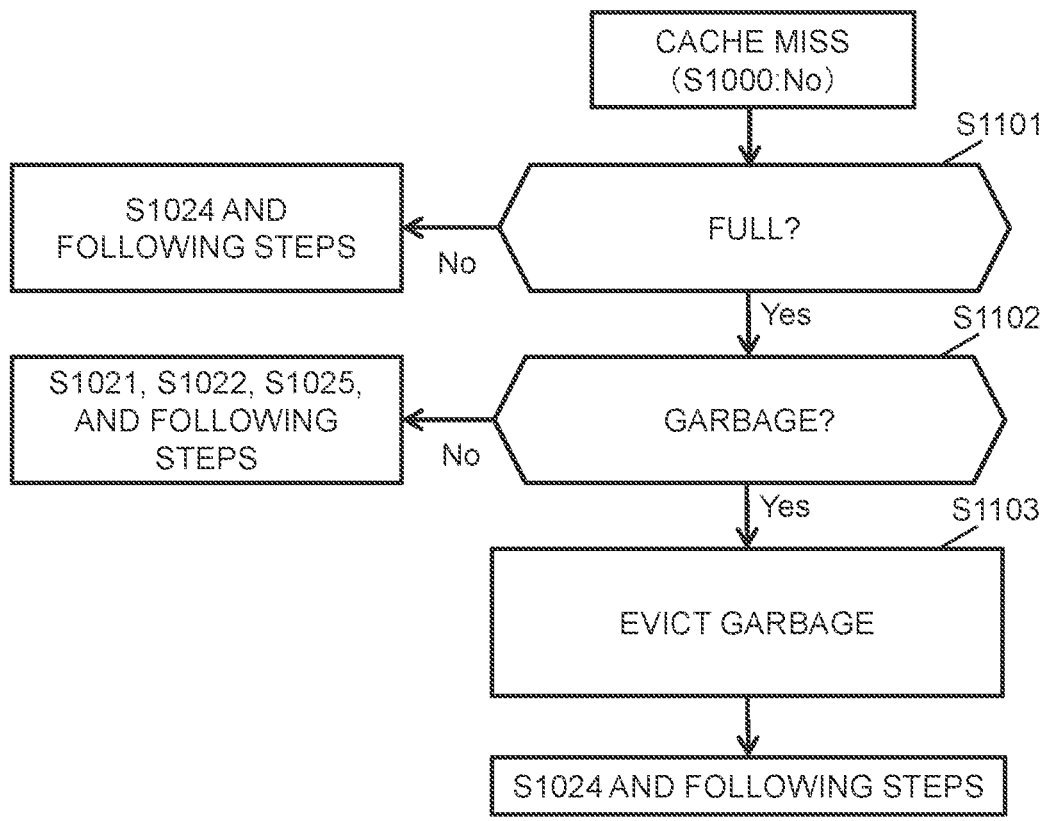
FIG. 11 is a diagram illustrating a part related to a modified example of cache control.

FIG. 11 is a diagram illustrating a part related to a variation of a series of processing performed by the IoT server 103 that received the connection request. In this variation, the connection over time may not be considered in the cache priority.

For example, in the case of S1000: No, the cache control unit 222 determines whether the cache area is full (S1101). If the determination result in S1101 is false (S1101: No), the processing of S1024 and the following processing are performed.

If the determination result in S1101 is true (S1101: Yes), the cache control unit 222 determines whether there is garbage, that is, whether there is a cache record including a client information set, connection over time of which is older than the current time, in the client certificate cache DB 211 (S1102). If the determination result in S1102 is true (S1102: Yes), the cache control unit 222 evicts at least one piece of garbage from the client certificate cache DB 211. As a result, whether there is garbage is determined upon cache access for determination as to whether there is a cache hit. That is, garbage eviction is efficiently performed.

If the determination result in S1102 is false (S1102: No), since the cache area is full, S1021, S1022, and S1025 and the following processing are performed.

Note that S1102 and S1103 may be performed asynchronously (e.g., periodically) with the series of processing performed when a connection request is received; however, by performing these steps in the series of processing performed upon reception of a connection request as in the embodiment and the variation described above, the garbage can be evicted efficiently.

Second Embodiment

A second embodiment will be described. In the following description, differences from the first embodiment will be mainly focused, and the description of the common points with the first embodiment will be omitted or simplified.

Figure 12:
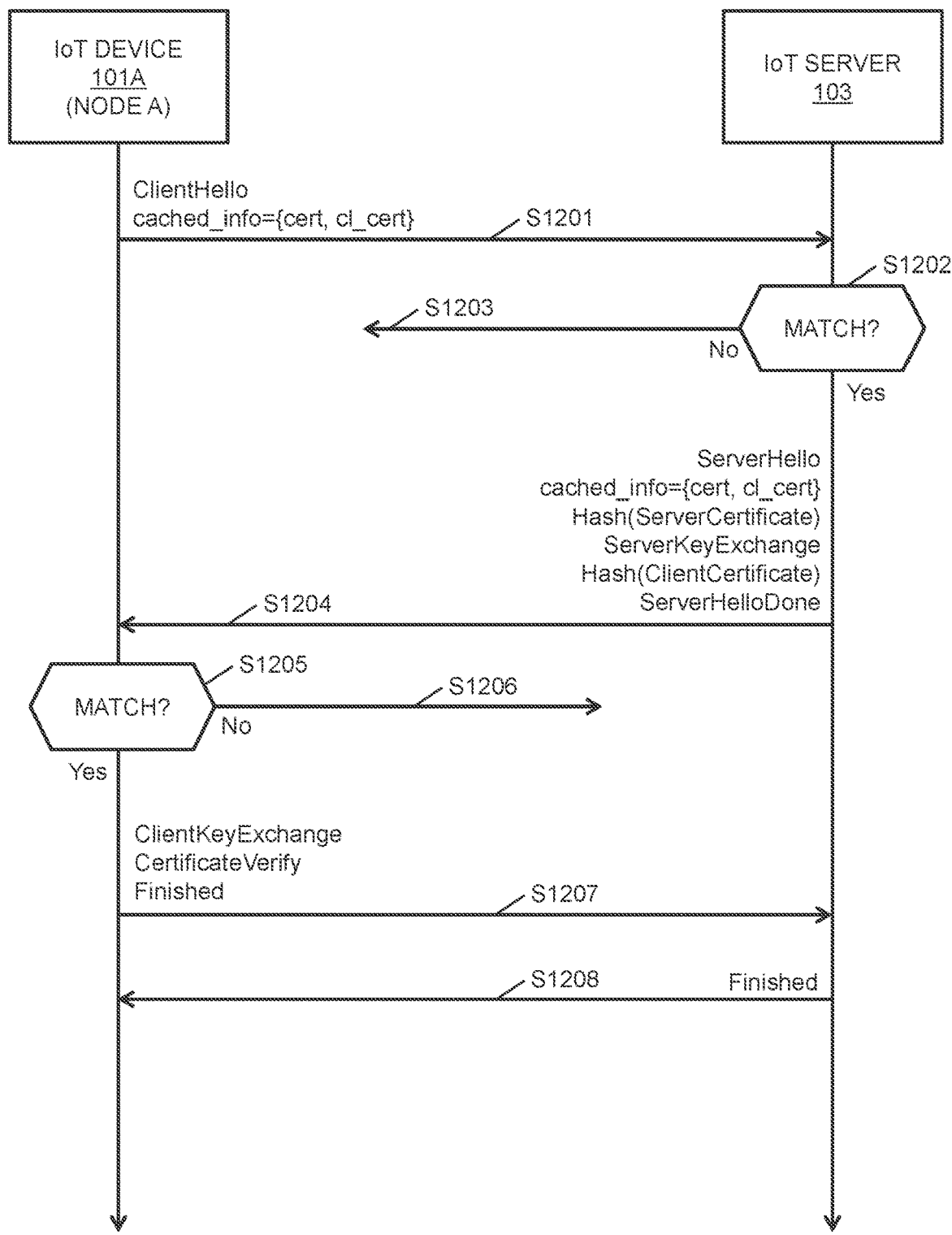
FIG. 12 is a diagram illustrating an overview of a flow of a handshake according to a second embodiment of the present invention.

FIG. 12 is a diagram illustrating an overview of a flow of a handshake according to the second embodiment of the present invention.

A ClientHello is transmitted from the connection control unit 321 of the IoT device 101 (S1201). Here, cl_cert in cached_info of the ClientHello includes a client certificate flag (a flag indicating that a client certificate cached in the IoT server 103 is used), but does not include a hash client certificate. Although not illustrated, the ClientHello includes at least one of a client ID of the IoT device 101 and a session ID of the session.

Therefore, the client judgement in a validity determination (S1202) in the IoT server 103 is a determination as to whether or not a cache hit occurs in which a cache record is found in the client certificate cache DB 211 using the client ID and/or the session ID. If the result of the validity determination is false (S1202: No), in particular, if the result of the client judgement is false, the same processing as S503 is performed (S1203).

If the result of the validity determination is true (S1202: Yes), in response processing (S1204) by the connection control unit 221 of the IoT server 103, a Hash(ClientCertificate) is transmitted instead of a CertificateRequest. The Hash(ClientCertificate) is a message including a hash client certificate obtained from a cache record hit in the IoT server 103. In FIG. 12, a Hash(Certificate) including a hash server certificate is expressed as "Hash(ServerCertificate)", and a Hash(Certificate) including a hash client certificate is expressed as "Hash(ClientCertificate)".

The connection control unit 321 of the IoT device 101 receives the Hash(ClientCertificate) from the IoT server 103. In a validity determination (S1205) of the IoT device 101, the certificate control unit 323 determines whether or not the hash client certificate in the Hash(ClientCertificate) matches the hash value of the client certificate 313 in the storage unit 302. If the result of this determination is false (S1205: No), the connection control unit 321 transmits no-cache-hit information indicating that no cache hit occurs or the client certificate 313 to the IoT server 103 (S1206). When the IoT server 103 receives the no-cache-hit information, the connection control unit 221 of the IoT server 103 may transmit a CertificateRequest (a request for the client certificate) to the IoT device 101, and then receive the client certificate 313 from the IoT device 101 responding to the request. In this way, the client certificate 313 or its hash value may be cached in the IoT server 103.

If the result of the validity determination in S1205 is true (S1205: Yes), the handshake continues without transmission of the no-cache-hit information or the client certificate 313. Specifically, the connection control unit 321 of the IoT device 101 performs response processing (S1207). In the response processing in S1207, a Hash(ClientCertificate) that is a Hash(Certificate) including a hash client certificate is not transmitted.

According to the second embodiment, it can be expected that the handshake is completed without the IoT device 101 transmitting a hash client certificate, and accordingly, a connection is established.

Although some embodiments and variations have been described above, these are merely examples for explaining the present invention, and the scope of the present invention is not limited only to these embodiments or the variations. The present invention may be implemented in various other embodiments.

For example, according to TLS or DTLS, an IoT device 101 transmits a connection request associated with an official session ID to the IoT server 103. If there is a cache hit, which is a state where a session information set including a session ID that matches the session ID is cached in the IoT server 103, a session is resumed. In session resumption, a part of the handshake procedure illustrated in FIGS. 4 and 5 is omitted. That is, a handshake necessary for session establishment is simplified.

For session resumption, a session information set necessary for a session needs to be cached in the IoT server 103. In other words, when the cache hit rate of the session information set in the IoT server 103 is high, there is a high probability of session resumption.

Therefore, the cache control described with reference to FIGS. 6 to 11 can be applied to cache control of a session information set. For example, in the description with reference to FIGS. 6 to 11, "client information set" can be replaced with "session information set", and "client certificate cache DB" can be replaced with "session cache DB". In such a session cache DB, a session information set is cached. The session cache DB may have a record for each session, and the configuration of each record may be the same as the client certificate cache DB except that the client information set is replaced with the session information set.

By the replacement as described above, for example, the following IoT server 103 (an example of a server) can be obtained. That is, the IoT server 103 is configured to resume a session using a cached session information set when a connection request associated with a session ID is received from any of IoT devices 101 (example of clients), the server resuming the session in a case where there is a cache hit, which is a state where a session information set including a session ID that matches the associated session ID is cached in a cache area. In the IoT server 103, a connection control unit 221 calculates predicted next connection time which is a sum of time related to reception of the connection request and a connection request period of the client. A cache control unit 222 determines, at least when the cache area is full, whether to cache a target session information set in the cache area, the target session information set being the session information set including the session ID associated with the connection request, on the basis of the predicted next connection time calculated for the IoT device 101.

For each of the IoT devices 101, the predicted next connection time is based on a connection request period as a result of connection with the IoT device 101, and cache control is performed based on such predicted time. As a result of this, improvement of the cache hit rate of a session information set can be expected without requiring each of the IoT devices 101 to notify the IoT server 103 of the predicted next connection time.

Note that, in addition to the client certificate cache DB 211, a session cache DB may be provided.

In the embodiment, in order to simplify the explanation, the correspondence between the IoT devices 101 and the session IDs is 1:1 (it is assumed that one session is performed between one IoT device 101 and the IoT server 103); however, the correspondence between the IoT devices 101 and the session IDs may be 1:multiple. In the storage unit of the IoT server 103, at least one of a session ID, a connection request period, a connection request interval history, and allowable delay time may be managed for each session and for each of the IoT devices 101. For example, a connection request period added to predicted next connection time for a certain session of a certain client may be the connection request period corresponding to the certain session of the certain client.

What is claimed is:

1. A server comprising:
a connection control unit that controls connection with a client;
a certificate control unit that determines validity of a certificate; and
a cache control unit,
wherein when a client certificate is required to connect to the client according to a predetermined communication protocol, the connection control unit receives a connection request that is a message associated with specific information from the client in a handshake for connection with the client,
wherein the certificate control unit makes a client judgement as to whether or not a cache hit occurs, where the cache hit is to find a summary client certificate in a cache area using the specific information associated with the connection request,
wherein when a result of the client judgement is true, the connection control unit returns to the client a connection response including hit information indicating that a cache hit occurs,
wherein when the connection control unit receives a completion message indicating completion of the handshake from the client that has received the connection response, the connection control unit returns a completion response indicating the completion of the handshake to the client to establish the connection,
wherein the connection request is a connection request, or a message transmitted between transmission of the connection request and transmission of a message indicating completion of the handshake,
wherein the connection control unit calculates predicted next connection time which is a sum of time related to reception of a connection request from the client and a connection request period of the client, and
wherein the cache control unit determines, at least when the cache area is full, whether to cache a target client information set in the cache area, the target client information set being a client information set including a client certificate for the connection request, on the basis of the predicted next connection time calculated for the client.

2. The server according to claim 1,
wherein the predetermined communication protocol is TLS or DTLS, and
wherein the connection request is a ClientHello or a message transmitted between transmission of a ClientHello and transmission of a message indicating completion of the handshake.

3. The server according to claim 2,
wherein the connection request is the ClientHello,
wherein the specific information includes the summary client certificate,
wherein the summary client certificate is set in cached_info of the connection request,
wherein the connection response is a ServerHello, and
wherein the hit information is set in cached_info of the ServerHello.

4. The server according to claim 2,
wherein the connection request is the ClientHello,
wherein the specific information includes at least one of a client ID of the client and a session ID of a session, and information indicating that a client certificate cached in the server is used,
wherein the hit information is set in cached_info of the connection response,
wherein when a result of the client judgement is true, the connection control unit transmits a summary client certificate corresponding to the cache hit to the client, and
wherein when the transmitted summary client certificate matches a summary client certificate of a client certificate possessed by the client, the connection control unit receives the completion message from the client.

5. The server according to claim 1,
wherein the connection control unit updates the connection request period of the client on the basis of a plurality of connection request intervals including a latest reception interval of connection requests from the client.

6. The server according to claim 1,
wherein the cache control unit determines whether to cache the target client information set in the cache area on the basis of cache priority of the target client information set and cache priority of each of all client information sets cached in the cache area, and wherein the cache priority of each client information set is based on predicted next connection time associated with the client information set.

7. The server according to claim 1,
wherein when cache priority of the target client information set is higher than cache priority of at least one of the client information sets cached in the cache area, the cache control unit evicts, from the cache area, a client information set having a lowest cache priority among the client information sets cached in the cache area.

8. The server according to claim 1,
wherein each of the client information sets cached in the cache area is associated with predicted next connection time calculated for the client information set.

9. The server according to claim 6,
wherein the cache priority of each of the client information sets is also based on connection over time associated with the client information set, in addition to the predicted next connection time associated with the client information set, and wherein for each of the client information sets, connection over time is a sum of predicted next connection time associated with the client information set and allowable delay time associated with a client corresponding to the client information set.

10. The server according to claim 9,
wherein cache priority of a client information set having a connection over time older than a current time is lower than cache priority of a client information set having a connection over time that is the current time or future time,
wherein among client information sets having a connection over time older than the current time, as the connection over time is farther from the current time, the lower cache priority is, and
wherein among client information sets having a connection over time that is the current time or future time, as predicted next connection time is farther from the current time, the lower cache priority is.

* * * * *